United States Patent
Mahl et al.

[15] 3,683,748
[45] Aug. 15, 1972

[54] HYDRAULIC SYSTEM

[72] Inventors: Willy Mahl, Ditzingen; Walter Werner, Waibligen, both of Germany

[73] Assignee: Robert Bosch GmbH, Stuttgart, Germany

[22] Filed: Oct. 9, 1970

[21] Appl. No.: 79,482

[30] Foreign Application Priority Data

Oct. 15, 1969 Germany..........P 19 51 833.3

[52] U.S. Cl. .......................91/416, 91/449, 91/469, 137/625.68
[51] Int. Cl............................................F15b 15/17
[58] Field of Search........91/416, 469, 431, 449, 415; 137/625.68, 625.69

[56] References Cited

UNITED STATES PATENTS

| | | |
|---|---|---|
| 1,585,529 | 5/1926 | Boving..........................91/416 |
| 3,476,016 | 11/1969 | Dixon et al. .................91/415 |
| 3,363,517 | 1/1968 | Powers.......................91/416 |
| 3,401,604 | 9/1968 | Blatt et al. ..................91/416 |

FOREIGN PATENTS OR APPLICATIONS 1,803,852   4/1970   Germany.....................91/416

Primary Examiner—Paul E. Maslousky
Attorney—Michael S. Striker

[57] ABSTRACT

A piston is slidably accommodated in a cylinder and subdivides the interior thereof into a first and a second chamber located at opposite axial sides of the piston. A supply conduit communicates with the first cylinder chamber. A source of pressurized fluid includes a pressure conduit and a fluid reservoir includes a return conduit. A control unit is connected with all of these conduits and includes a control member slidable between a neutral position in which it disconnects the supply conduit from the pressure conduit and from the return flow conduit, a first operating position in which it connects the supply conduit with the pressure conduit while disconnecting it from the return flow conduit, and a second operating position in which it connects the supply conduit with both the pressure conduit and the return flow conduit. A throttling passage connects the cylinder chambers with one another.

10 Claims, 4 Drawing Figures

INVENTORS
Willy MAHL
Walter WERNER

By
their ATTORNEY

HYDRAULIC SYSTEM

BACKGROUND OF THE INVENTION

The present invention relates generally to hydraulic systems, and more particularly to hydraulic systems for use in or on vehicles. Still more particularly the present invention relates to a hydraulic system for use in agricultural machines.

Although the present invention has a wider range of applicability, it will hereafter be discussed for the sake of convenience of explanation with reference to its utilization in an agricultural machine, and more particularly in a harvesting machine.

In harvesting machines a scoop, threshing table or the like must frequently be adjusted in its position with reference to the ground over which the vehicle travels, and therefore with reference to the vehicle itself. For this purpose it is known to utilize a hydraulic system having a double-acting cylinder and piston unit with each of the cylinder chambers which is defined in the cylinder of the unit by the piston accommodated in the cylinder, being individually controlled by a separate control device. Thus, the two cylinder chambers are completely cut off from one another and no communication exists between them. This has been found to be disadvantageous for certain reasons, namely because such a construction can and frequently does lead to damage to the cylinder and piston unit due to pressure peaks. This will be readily understood if one considers that if the agricultural machine moves over rough terrain, obstacles or the like, relative movements between the movable component—e.g. the threshing table or the like—and the vehicle itself are almost inevitable and occur in form of swinging movements in which the threshing table moves up and down with reference to the vehicle when the latter is jolted severely enough by traversing obstacles or generally rough terrain. Such movements, however, cause the development of pressure peaks in the chamber of the cylinder and piston arrangement and lead to the aforementioned undesirable damage.

SUMMARY OF THE INVENTION

It is, accordingly, an object of the present invention to overcome the aforementioned disadvantages.

More particularly it is an object of the present invention to provide an improved hydraulic system utilizing a double-acting cylinder and piston arrangement which is not possessed of the aforementioned difficulties.

A concomitant object of the invention is to provide such an improved hydraulic system which, because of its novel construction, has an increased lifetime and is considerably simpler than what is known from the prior art.

In pursuance of the above objects, and others which will become apparent hereafter, one feature of the present invention resides, briefly stated, in a hydraulic system which is particularly but not exclusively for use in agricultural machines, and which comprises a combination of cylinder means and piston means slidably accommodated in the cylinder means and subdividing the interior thereof in a first and a second cylinder chamber located at opposite sides of the piston means. A supply conduit communicates with the first cylinder chamber. A source of pressurized fluid is provided and includes a pressure conduit. A fluid reservoir is provided and includes a return-flow conduit.

The novel hydraulic system further comprises control means which is connected with all of these conduits and which controls a control member movable between a neutral position disconnecting the supply conduit from the pressure conduit and the return-flow conduit, a first operating positioning connecting the supply conduit with the pressure conduit while disconnecting it from the return-flow conduit, and a second operating position connecting the supply conduit with both the pressure conduit and the return-flow conduit.

Finally, we provide fluid-conducting means connecting the cylinder chambers with one another, and throttling means which is interposed in the fluid-conducting means.

The system according to the present invention is not only extremely simple in its construction and operation, but it is capable of completely eliminating or at least substantially reducing pressure peaks in the chambers of the cylinder means, caused for instance by relative displacement of the movable component—e.g. the threshing table—and the vehicle.

According to a further embodiment of the invention the piston means advantageously comprises a differential piston, that is a piston having in one of the cylinder chambers an exposed pressure surface of a smaller surface area and in the other of the cylinder chambers an exposed pressure surface of a larger surface area, and according to the present invention the cylinder chamber in which the larger-surface area of the piston is exposed will be the first cylinder chamber with which the supply conduit communicates.

The fluid-conducting means may be in form of a separate conduit externally of the cylinder means and connecting the cylinder chambers with one another, with the throttling means being interposed in this conduit. However, it may also be in form of a passage or channel provided in the piston itself and communicating at opposite axial ends of the latter with the first and second cylinder chambers, with the throttling means being interposed in this channel. Again, it could be in form of a channel provided in the peripheral wall of the cylinder means itself and the throttling means would then again be interposed in this channel. The throttling means itself may be non-adjustable or, if desired, it may be adjustable in that the active cross-sectional area of its throttling passage may be varied by increasing it or decreasing it to thereby concomitantly vary the throttling action afforded by the throttling means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
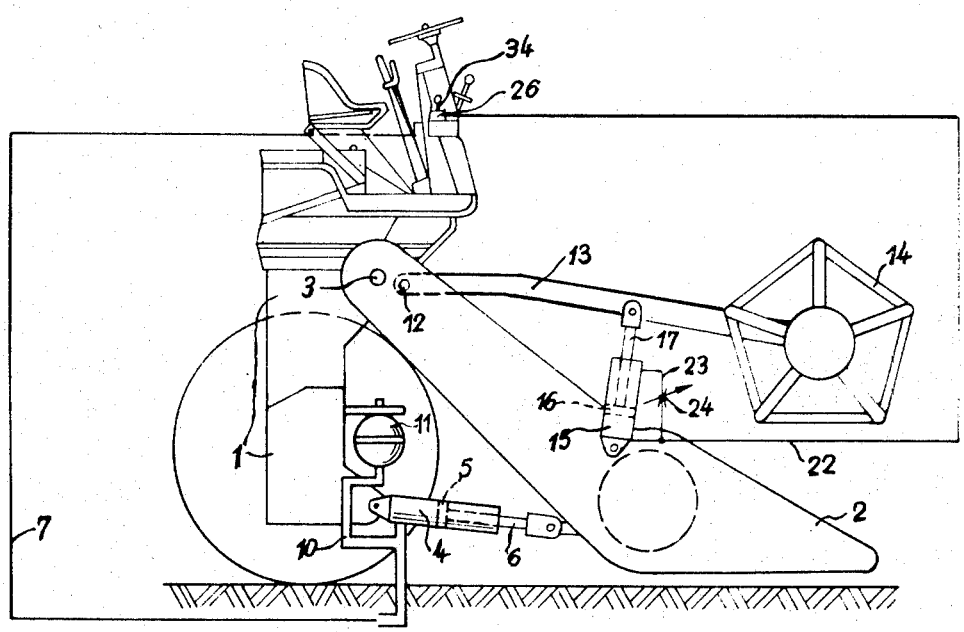
FIG. 1 is a simplified diagrammatic side-elevational view of a harvesting machine employing the present invention.

Discussing now the drawing in detail it will be noted that in FIG. 1 we have illustrated in simplified diagrammatic side-elevational view a harvesting machine provided with an embodiment of our invention. More specifically, the harvesting machine is in form of a combine, that is a harvesting and threshing machine combined and having a diagrammatically illustrated chassis 1. Mounted on the chassis 1 pivotable or tiltable about an axis 3 is a threshing table 2. A lifting cylinder 4, that is a cylinder which is intended to raise and lower the threshing table 2 with reference to the ground (diagrammatically illustrated) over which the agricultural machine moves, is also pivotably mounted on the chassis 1 and accommodates a slidably and seal-tightly guided piston 5. The latter is connected with a piston rod 6 which is pivotably secured to the threshing table 2. A supply conduit 7 connects the cylinder 4 with a non-illustrated control device which serves to connect the cylinder 4 with—or disconnect it from—a central source 8 of pressurized fluid, or with an associated supply or fluid reservoir 9. This is done in order to cause the piston 5 to move in a sense requisite for either raising or lowering the threshing table 2, and for maintaining it in the once-selected position. Conduit 10 extends from the conduit 7 to a hydro-storage device — such as a dashpot of known construction—and which is identified with reference numeral 11 and mounted on the chassis 1, serving as a spring or shock absorber for the threshing table 2.

The operation and construction of the system constituted by the cylinder 4, the piston 5, the associated conduits and the non-illustrated control device cooperating with them will be understood from the description (following hereafter) of an additional hydraulic system provided on the machine according to FIG. 1 and constituted in accordance with an embodiment of the present invention, so that a separate explanation is not believed to be necessary.

Adjacent its upper end the threshing table 2 is provided with an axle or shaft 12 on which there are pivotably mounted two carrier arms 13 carrying a reel 14. A work cylinder 15 is pivotably connected to the threshing table 2 and accommodates a seal-tightly and slidably guided piston 16 therein. The latter is provided with a piston rod 16 which in turn is connected pivotably on one of the carrier arms 13.

The opposite axial end faces of the piston 16 define within the cylinder 15—which is subdivided by the piston 16—two fluid or working spaces 20 and 21. A supply conduit 22 communicates with the space 20 and a fluid-conducting means or conduit 23 communicates with the supply conduit 22 as well as with the cylinder space 21, with a manually variable throttling means 24—such as a throttling passage or gap—being interposed in the fluid-conducting conduit 23.

The supply conduit 22 is connected with a conduit 25 of a control means or control device 26, and the latter in turn is connected via a pressure conduit 27 and 28 with the source of pressurized fluid 8, here illustrated as a pump. A return-flow channel 29 of the device 26 communicates with a return-flow conduit 30 which in turn communicates with the fluid reservoir 9 for the pump 8. Intermediate the channel 27 and the channel 29 there is provided a channel 31 in which there is interposed a pressure-limiting valve 32 which opens in the direction to the channel 29.

Figure 2:
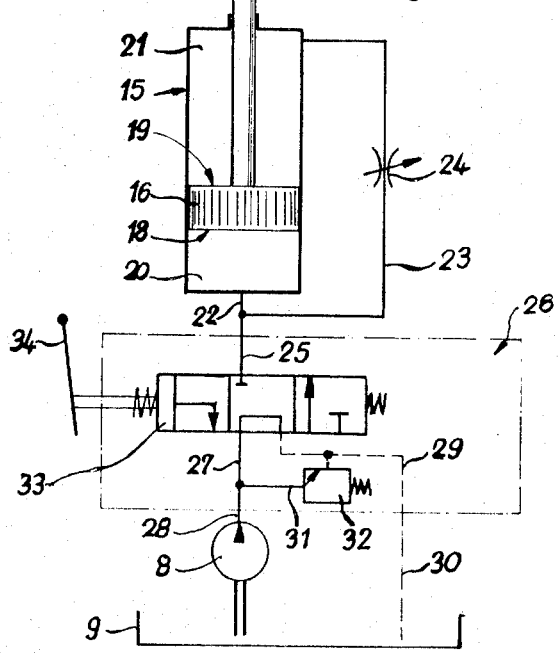
FIG. 2 is a simplified diagrammatic view showing a hydraulic system according to one embodiment of the present invention.

As the drawing shows in FIG. 2, the control device 26 is constructed as a three-way valve having a slidable control member 33 which can be displaced between a neutral and two operating positions by moving a hand lever 34. The neutral position is the center position of the member 33 and when the latter is in that position, the pressure channel 27 is connected with the return-flow channel 29, whereas the channel 25 communicating with the supply conduit 22 is closed off. When the member 33 is moved left of center to the position in which the arms 13 are to be lifted with reference to the ground, then the channel 27 is in communication with the channel 29 and thereby the supply conduit 22, whereas the return-flow channel 29 is closed off. Finally, when the arms 13 are to be lowered with reference to the ground, that is when the member 33 is moved right of center to the second operating position, the channel 27 as well as the channel 25 communicating with the supply conduit 22, are both in communication with the return-flow channel 29.

With this construction, and assuming that for instance the reel 14 carried by the arms 13 is to be lifted with reference to the ground and therefore with reference to the threshing table 2, the operator manipulates the diagrammatically illustrated lever 34 in a sense displacing the sliding member 33 to lifting position, that is to that operating position in which it is located at the left as seen in FIG. 2. When this is done, pressurized fluid supplied by the pump 8 passes via the conduit 28, the channel 27, the member 33, the channel 25 and the supply conduit 22 into the space 20 of the cylinder 15, displacing the piston 16 into the space 21. Fluid displaced as a result of such movement out of the space 21 passes via the throttling means 24 and the fluid-conducting conduit 23 into the supply conduit 22 and from there also into the space 20. At the same time, of course, the piston rod 17 raises the arms 13 with reel 14 about the axis 12 in counterclockwise direction, that is away from the table 2. Once the reel has assumed the desired position, the operator manipulates the lever 34 to return the member 33 to the central or neutral position whereby the channel 25 is closed off and pressurized fluid supplied by the pump 8 flows via the channels 29 and 30 back into the reservoir 9.

Conversely, if it is desired to lower the reel 14 so as to move it closer to the threshing table 2, the lever 34 is manipulated by the operator in a sense displacing the member 34 to the second operating or lowering position, that is towards the right in FIG. 2. When this is done, the space 20 is connected via the supply conduit 22 and the channel 25 as well as the device 26 with the reservoir 9, together with the pressure channel 27, both via the return-flow channels 29 and 30. Pressure fluid can thus flow out of the space 20 through the conduit 22, the channel 25, the member 33, the return-flow channel 29 and the return-flow conduit 30 into the fluid reservoir 9 whereby the piston 16 is able to move back into the space 20 with a concomitant displacement of the arms 13 with the reel 14 about the axis 12 closer towards the threshing table 2, that is downwardly in FIG. 1. When the desired position of the reel has been reached, the member 33 is again returned to neutral or central position by requisite manipulation of the lever 34.

It is clear from this that except for the relatively short times which the member 33 is required to be in its two operating positions for either raising or lowering the arms 13, it will be in its neutral or center position. As already pointed out, when it is in this neutral or center position the cylinder 15 is disconnected with reference to the pump 8 as well as the reservoir 9, meaning that no pressurized fluid can enter it and no fluid can flow out of it to the reservoir 9. Thus, whatever movable element is controlled by the cylinder 15 and the associated piston 16, in this case the arms 13 and the reel 14, will be retained in the once-selected position. However, the type of agricultural vehicle shown in FIG. 1 must traverse rough and irregular terrain so that its movement is anything but smooth. As a consequence there will be almost continuously undesired swinging movements, resulting from mass forces which become active when the apparatus or vehicle travels over rough terrain and is jolted as a consequence. To some extent these movements are damped by the tires of the vehicle as well as by the hydro-spring or dash-pot 11, but this damping effect is only partial and, particularly in the case of resonance conditions, the pressure peaks which result in the hydraulic system can have destructive consequences. According the present invention such pressure peaks and the resulting destruction are avoided, and thus the hydraulic system is protected, by providing the damping device connecting the cylinder spaces 20 and 21. Assuming, for instance, that a pressure peak resulting from swinging movements of the pivotable masses due to travel of the apparatus over uneven terrain occurs in the cylinder space 20, then the piston 16 will move to some extent into the cylinder space 21 because the pressure medium displaced during such movement of the piston 16 out of the cylinder space 21 can travel via the fluid-conducting conduit 23 and the throttling means 24 into the cylinder space 20. If that were not the case, that is if the cylinder 21 were out of communication with the cylinder space 20, then the pressure in the cylinder space 21 would be compressed beyond acceptable limits and damage would result to the components involved. Conversely, if subsequently to the relative movement of the threshing table 2 and the arms 13 in one direction, a return movement in the opposite direction takes place, then the piston 16 and the arms 13 associated with it will follow this movement in a damped manner. In the known double-acting cylinder and piston arrangements the previous movement would have caused an extreme pressure-relationship between the two (unconnected) cylinder spaces, namely a very high pressure in the space 21 and a very low pressure in the space 20, which would have an almost instantaneous return of the piston 16 into the cylinder space 20 as its consequence when the pressure peak abates. By contrast, the present invention assures that the pressure differential between the spaces 20 and 21 is and remains very low. This is the result of the fact that a portion of the pressure medium in the cylinder space 21 becomes displaced out of the same as the pisson 16 enters the space 21, and can travel via he fluid-conducting conduit 23 and the throttling means 24 into the cylinder space 20. When subsequently the movable components rapidly return towards their original position which they had assumed prior to the jolt causing the pressure peak, the piston 16 returns into the cylinder space 20 as a result of the rapid pressure decrease in the latter space; on the other hand, pressure fluid is in effect aspirated into the lower-pressure space 20 out of the higher-pressure space 21 via the fluid-conducting conduit 23, so that thereby the return movement of the piston 16 into the space 20 is damped.

In this manner the pressure peaks are either avoided or at least so reduced that danger to the system as a result of damage caused by such pressure peaks is eliminated. The throttling means 24 assures that the inherent vibratory frequency of the mass acting upon the working cylinder 15 is so changed that it no longer coincides with the exciter frequency.

The illustration of the throttling means 24 in FIG. 2 is intended to indicate that the throttling means may be of the adjustable type, rather than the fixed type. In other words, it may be of the type wherein the cross-section of the throttling passage may be varied to thereby concomitantly vary the throttling action in a sense either increasing it or decreasing it. Throttling means of such type, either fixed or adjustable, are well known and their particular construction forms no part of the present invention. Incidentally, it should be pointed out that hydro-springs or dash-pots such as the one identified with reference numeral 11 in FIG. 1 are also well known and also do not in themselves form a part of the present invention.

Figure 3:
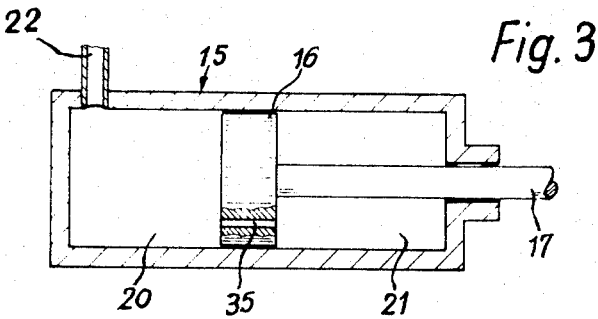
FIG. 3 is a partially sectioned enlarged detail view illustrating a further embodiment of the invention.

In the embodiment of FIG. 3 the system generally should be understood to be the same as in FIG. 2. The embodiment of FIG. 3 differs from that of FIG. 2 in that the cylinder spaces 20 and 21 are connected with one another in a manner different from that shown in FIG. 2. In FIG. 3 the fluid-conducting passage 23 which in FIG. 2 is located exteriorly of the cylinder 15, is replaced with a passage 35 provided in the piston 16 itself connecting the opposite axial end faces of the latter and being so selected as to its cross-sectional area that it serves as a throttling gap which throttles the movement of pressure fluid from one into the other of the spaces 20 and 21. In other respects the embodiment of FIG. 3 is the same as that of FIG. 2 except for one additional difference namely that the piston 16 in FIG. 3 is a differential piston, meaning that it has a smaller surface area exposed in one of the cylinder spaces and a larger second surface area exposed in the other of the cylinder spaces. In the embodiment of FIG. 3 the surface having the larger surface area is exposed in the cylinder space 20 with which the supply conduit 22 communicates. Differential pistons per se are, of course, already known.

Figure 4:
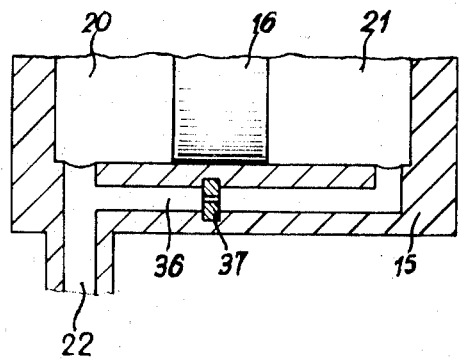
FIG. 4 is a fragmentary view similar to FIG. 3 but illustrating yet an additional embodiment of the invention.

Coming, finally, to the embodiment illustrated in FIG. 4, it is pointed out that this also is the same as that of FIG. 2 except for the manner in which the cylinder spaces 20 and 21 are connected with one another. In FIG. 4 the circumferential wall bounding the cylinder 15 is provided with a passage 36 communicating with the cylinder space 21 and, via the inner end of the supply conduit 22, with the cylinder space 20. Throttling means defining a throttling gap 37 is interposed in the channel 36 and serves the same purpose and operates in the same manner as previously described. The throttling means 37 is here in the form of an insert accommodated in suitable manner in the passage 36, and it will be appreciated that its introduction into the passage 36 can be effected in various different ways, for instance by providing a suitable bore or cut-out in the circumferential wall of the cylinder 15 through which the throttling means 37 is introduced until it becomes lodged in the position illustrated in FIG. 4.

Needless to say, it is possible to make both the throttling means 35 and the throttling means 37 in FIGS. 3 and 4, respectively, adjustable in a sense permitting their active cross-sectional areas to be varied to thereby concomitantly vary the throttling action which they exert.

It will be appreciated that the novel hydraulic system may be used to control other components in a vehicle or apparatus of the type shown in FIG. 1. For instance, and as already indicated in the discussion of FIG. 1, it could be used to control the operation of the cylinder and piston arrangement 4, 5. It will also be appreciated that the novel hydraulic system can be used not only with agricultural machines such as the harvesting combine shown in FIG. 1, but can be employed in all circumstances where the particular conditions prevail which are to be controlled and overcome with the present invention.

It will be understood that each of the elements described above, or two or more together, may also find a useful application in other types of constructions differing from the types described above.

While the invention has been illustrated and described as embodied in a hydraulic system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a hydraulic system for use in agricultural machines, a combination comprising cylinder means; piston means slidably accommodated in said cylinder means and subdividing the interior thereof in a first and a second cylinder chamber located at opposite sides of said piston means; a supply conduit communicating with said first cylinder chamber; a source of pressurized fluid, including a pressure conduit; a fluid reservoir, including a return-flow conduit; control means connected with said conduits and including a control member movable between a neutral position disconnecting said supply conduit from said pressure conduit and from said return-flow conduit, a first operating position connecting said supply conduit with said pressure conduit while disconnecting it from said return-flow conduit, and a second operating position connecting said supply conduit with both said pressure conduit and said return-flow conduit; fluid-conducting means connecting said cylinder chambers with one another in permanent open communication with each other; and throttling means interposed in said fluid-conducting means for throttling the flow of fluid therethrough.

2. In a hydraulic system as defined in claim 1, wherein said piston means comprises at least one piston rod extending through one of said cylinder chambers and outwardly of said cylinder means.

3. In a hydraulic system as defined in claim 1, said piston means comprising a differential piston having one pressure surface of a smaller surface area exposed in said second chamber, and an other pressure surface of a larger surface area exposed in said first chamber.

4. In a hydraulic system as defined in claim 1, said fluid-conducting means and said throttling means being provided in said piston means.

5. In a hydraulic system as defined in claim 1, said piston means comprising a piston; and wherein said fluid-conducting means comprises a channel provided in said piston and permanently communicating with said first and second chambers.

6. In a hydraulic system as defined in claim 5, said throttling means comprising a constriction.

7. In a hydraulic system as defined in claim 1, said fluid-conducting means comprising a fluid-conducting conduit permanently communicating with said supply conduit and with said second cylinder chamber, respectively.

8. In a hydraulic system as defined in claim 1, said cylinder means having a peripheral wall; and wherein said fluid-conducting means comprises a channel provided in said peripheral wall and permanently communicating with said first and second chambers, respectively.

9. In a hydraulic system as defined in claim 1, wherein said control means comprises a housing, and wherein said control member is accommodated in said housing and slidable between said neutral position and said operating positions.

10. In a hydraulic system as defined in claim 1, said throttling means having a throttling passage; and further comprising varying means for varying the active cross-sectional area of said throttling passage to thereby obtain a concomitant variation in the throttling action of said throttling means.

* * * * *